(12) United States Patent
Bartell (10) Patent No.: US 12,269,709 B2
(45) Date of Patent: Apr. 8, 2025

(54) TENSION BRAKE

(71) Applicant: Fisher-Barton Inc., Watertown, WI (US)

(72) Inventor: Ricky J. Bartell, Hartford, WI (US)

(73) Assignee: Fisher-Barton Inc., Watertown, WI (US)

( * ) Notice: Subject to any disclaimer, the term of this patent is extended or adjusted under 35 U.S.C. 154(b) by 464 days.

(21) Appl. No.: 17/945,412

(22) Filed: Sep. 15, 2022

(65) Prior Publication Data

US 2023/0090904 A1 Mar. 23, 2023

Related U.S. Application Data

(60) Provisional application No. 63/247,539, filed on Sep. 23, 2021.

(51) Int. Cl.
| | |
|---|---|
| *F16D 55/38* | (2006.01) |
| *B65H 75/30* | (2006.01) |
| *B65H 75/42* | (2006.01) |
| *B65H 75/44* | (2006.01) |
| *F16D 65/18* | (2006.01) |

(52) U.S. Cl.
CPC ......... *B65H 75/4428* (2013.01); *B65H 75/30* (2013.01); *B65H 75/425* (2013.01); *B65H 2401/12* (2013.01); *B65H 2401/15* (2013.01); *B65H 2403/7255* (2013.01); *F16D 55/38* (2013.01); *F16D 65/186* (2013.01); *F16D 2250/0046* (2013.01)

(58) Field of Classification Search
CPC ....... F16D 2055/0062; F16D 2055/007; F16D 2055/025; F16D 2055/38; F16D 65/186; F16D 2121/14; F16D 2250/0046
USPC .............. 188/83, 71.3; 242/244, 303
See application file for complete search history.

(56) References Cited

U.S. PATENT DOCUMENTS

| | | | | |
|---|---|---|---|---|
| 1,340,710 A | * | 5/1920 | Anderson | G03B 21/321 |
| | | | | 242/423.2 |
| 1,979,914 A | * | 11/1934 | Tomlin | B65H 59/04 |
| | | | | 242/423.2 |

(Continued)

FOREIGN PATENT DOCUMENTS

| | | |
|---|---|---|
| CN | 202666212 U | 1/2013 |
| EP | 0215598 B1 | 12/1989 |
| WO | 2009115417 A1 | 9/2009 |

*Primary Examiner* — Bradley T King
(74) *Attorney, Agent, or Firm* — Michael Best & Friedrich LLP (57) ABSTRACT

A tension brake assembly includes a frame, a plurality of brake pad assemblies, and a hub configured to be coupled to a rotating component. The hub includes a plurality of drive pins adjacent an annular wall. A rotor engages the plurality of drive pins such that rotation of the hub causes rotation of the rotor while permitting axial movement relative to the annular wall. The rotor has friction surfaces for engagement with the brake pad assemblies. An actuator is provided. Movement of the actuator in a first direction moves the friction components together in the axial direction to increase friction exerted by the tension brake assembly. Movement of the actuator in a second direction moves the friction components away from one another in the axial direction to decrease friction exerted by the tension brake assembly.

19 Claims, 13 Drawing Sheets

(56) References Cited

U.S. PATENT DOCUMENTS

| | | | | |
|---|---|---|---|---|
| 2,368,317 | A | * | 1/1945 | Meyer ............... F16D 59/02 188/71.7 |
| 2,997,137 | A | | 8/1961 | Harold |
| 3,469,658 | A | | 9/1969 | Forsythe |
| 3,489,253 | A | * | 1/1970 | Kershner ............ F16D 55/40 188/71.9 |
| 3,517,785 | A | * | 6/1970 | Cunningham ......... F16D 65/54 188/71.3 |
| 3,590,964 | A | | 7/1971 | Krause |
| 3,707,207 | A | * | 12/1972 | Kondo ............... F16D 55/32 188/71.5 |
| 3,991,860 | A | * | 11/1976 | Clemmons ........... F16D 55/40 188/73.32 |
| 4,177,883 | A | | 12/1979 | Margetts |
| 4,263,991 | A | * | 4/1981 | Morgan ............. B62D 5/07 188/170 |
| 4,325,522 | A | * | 4/1982 | Sauber ............. B65H 59/04 242/423.1 |
| 4,375,279 | A | * | 3/1983 | Koch ............... B65H 59/02 188/71.9 |
| 4,844,371 | A | * | 7/1989 | Tahara ............. B65H 23/063 242/423.2 |
| 5,178,235 | A | | 1/1993 | Montalvo, III et al. |
| 5,224,572 | A | | 7/1993 | Smolen et al. |
| 6,374,963 | B1 | | 4/2002 | Xie |
| 6,405,846 | B1 | | 6/2002 | Reik et al. |
| 6,945,370 | B1 | * | 9/2005 | Bunker ............. F16D 55/26 188/71.3 |
| 7,331,430 | B2 | * | 2/2008 | Valvano ............ F16D 65/095 188/73.1 |
| 9,897,154 | B2 | | 2/2018 | Root |
| 10,480,598 | B2 | | 11/2019 | Becker |
| 2006/0113152 | A1 | * | 6/2006 | Gripemark .......... F16D 55/36 188/72.3 |
| 2006/0118368 | A1 | * | 6/2006 | Arakawa ............ F16D 65/18 188/73.1 |
| 2008/0296105 | A1 | | 12/2008 | Jost et al. |
| 2009/0260927 | A1 | * | 10/2009 | Qu ................. B66D 5/14 188/73.37 |
| 2018/0304104 | A1 | | 10/2018 | Auston et al. |
| 2021/0396286 | A1 | * | 12/2021 | Davis .............. F16D 59/02 |
| 2023/0074911 | A1 | * | 3/2023 | Georgin ............ B60T 8/1703 |
| 2024/0270216 | A1 | * | 8/2024 | Martin, Jr. ........ F16D 55/225 |

* cited by examiner

TENSION BRAKE

RELATED APPLICATIONS

This application claims the benefit of U.S. Provisional Patent Application No. 63/247,539 filed Sep. 23, 2021, the entire content of which is hereby incorporated by reference herein.

BACKGROUND

The present invention relates to tension brake assemblies for industrial applications, and more particularly to tension brake assemblies for reel units.

Reel units are often mounted on stands or on movable trailers. Tension brakes are coupled to the reel units to control the speed/rate at which the reels deploy cable, tubing, and the like.

SUMMARY

The disclosure provides an improved tension brake for industrial applications, such as for use with reel units.

In one embodiment, the disclosure provides a tension brake assembly that includes a frame, a plurality of brake pad assemblies coupled to the frame, with each brake pad assembly including a brake pad carrier, a first brake pad having a friction surface on one side, and a second brake pad having friction surfaces on first and second sides. A plurality of brake pad pins support the first and second brake pads in the brake pad carrier while allowing the first and second brake pads to move in an axial direction relative to the frame. A hub assembly is configured to be coupled to a rotating component of the machine and includes a hub body having a first side configured to be mounted to the rotating component of the machine, and a second side facing the frame. The second side includes a friction surface for selective engagement with a friction surface on the second brake pad, and an annular wall extending toward the frame. A bearing is positioned within an aperture in the hub body. A plurality of drive pins extend from the second side of the hub body toward the frame adjacent the annular wall. A rotor is positioned adjacent the annular wall and engages the plurality of drive pins such that rotation of the hub body causes rotation of the rotor while permitting movement of the rotor in the axial direction relative to the annular wall and the drive pins. The rotor has a first friction surface on a first side of the rotor facing the frame, and a second friction surface on a second side of the rotor facing the hub body. The first brake pad is positioned for engagement with the first friction surface of the rotor and the second brake pad is positioned for engagement with the second friction surface of the rotor. A shaft has a first end supported by the bearing in the hub body and a second end. The shaft extends from the bearing, out of the aperture in the hub body, and though a bore in the frame. An actuator is coupled with the second end of the shaft. Movement of the actuator in a first direction moves the hub body relatively toward the frame in the axial direction to increase friction exerted by the tension brake assembly. Movement of the actuator in a second direction moves the hub body relatively away from the frame in the axial direction to decrease friction exerted by the tension brake assembly.

Other aspects of the disclosure will become apparent by consideration of the detailed description and accompanying drawings.

DETAILED DESCRIPTION

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
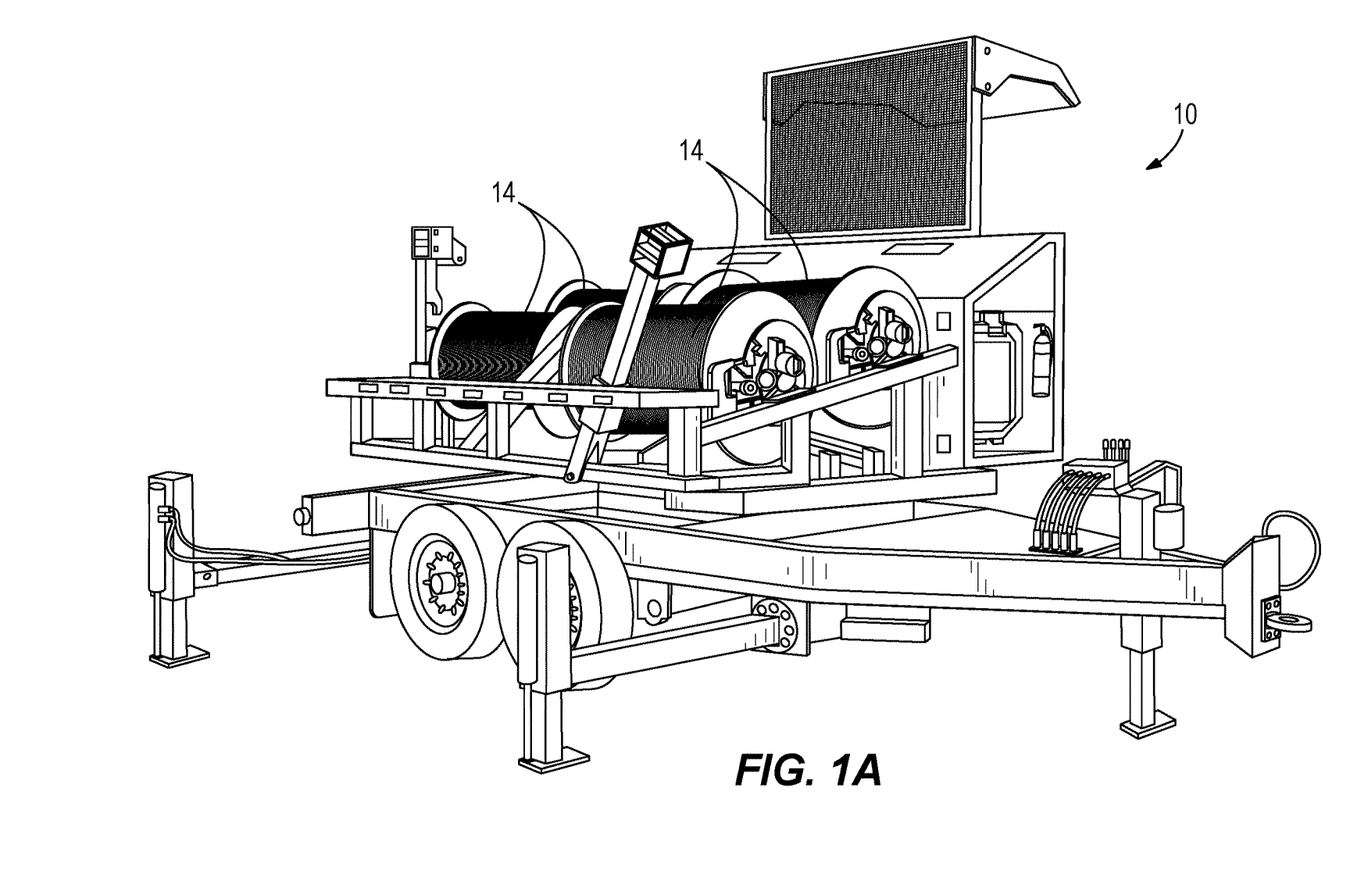
FIG. 1A is a perspective view of a reel unit in the form of a cable reel trailer to which the tension brake assembly according to the invention could be mounted.
Figure 1B:
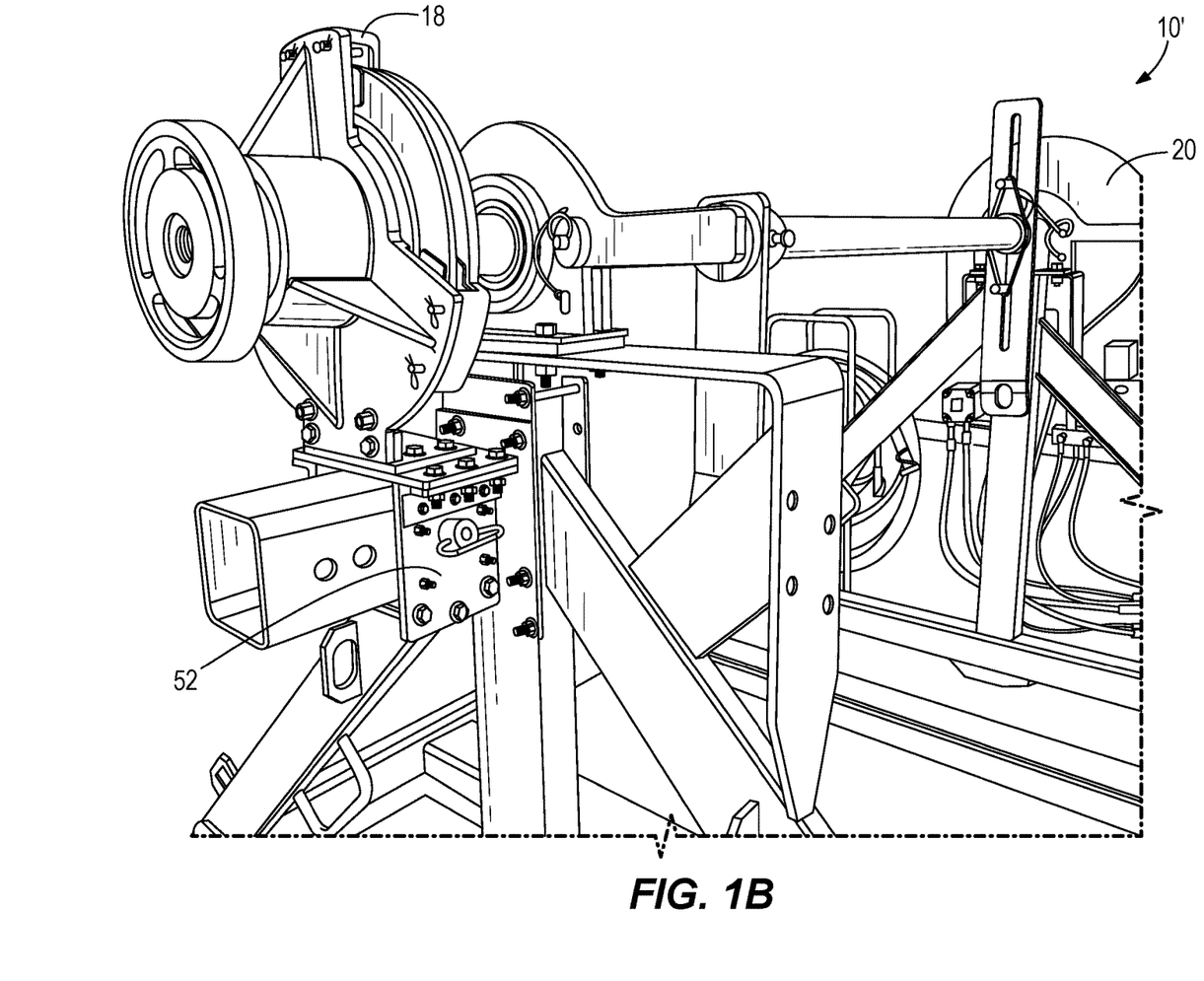
FIG. 1B is a perspective view of a reel unit in the form of a reel stand having a tension brake assembly according to the invention.

FIG. 1A illustrates a reel unit 10. The illustrated reel unit 10 takes the form of a mobile trailer unit that can transport reels of product 14 (e.g., wire, cable, tubing, and the like) to locations where it will be deployed (e.g., strung, pulled, laid, etc.). Other reel units may be stationary stands where less or no transportability is needed. FIG. 1B illustrates such a reel stand 10' having a tension brake assembly 18 mounted thereon. Typically, these reel units 10 and 10' have a drive system 20 (see FIG. 1B) that can drive the reels to deploy the product 14, and also have a tension brake to control or limit the speed at which the reels can rotate.

Figure 2:
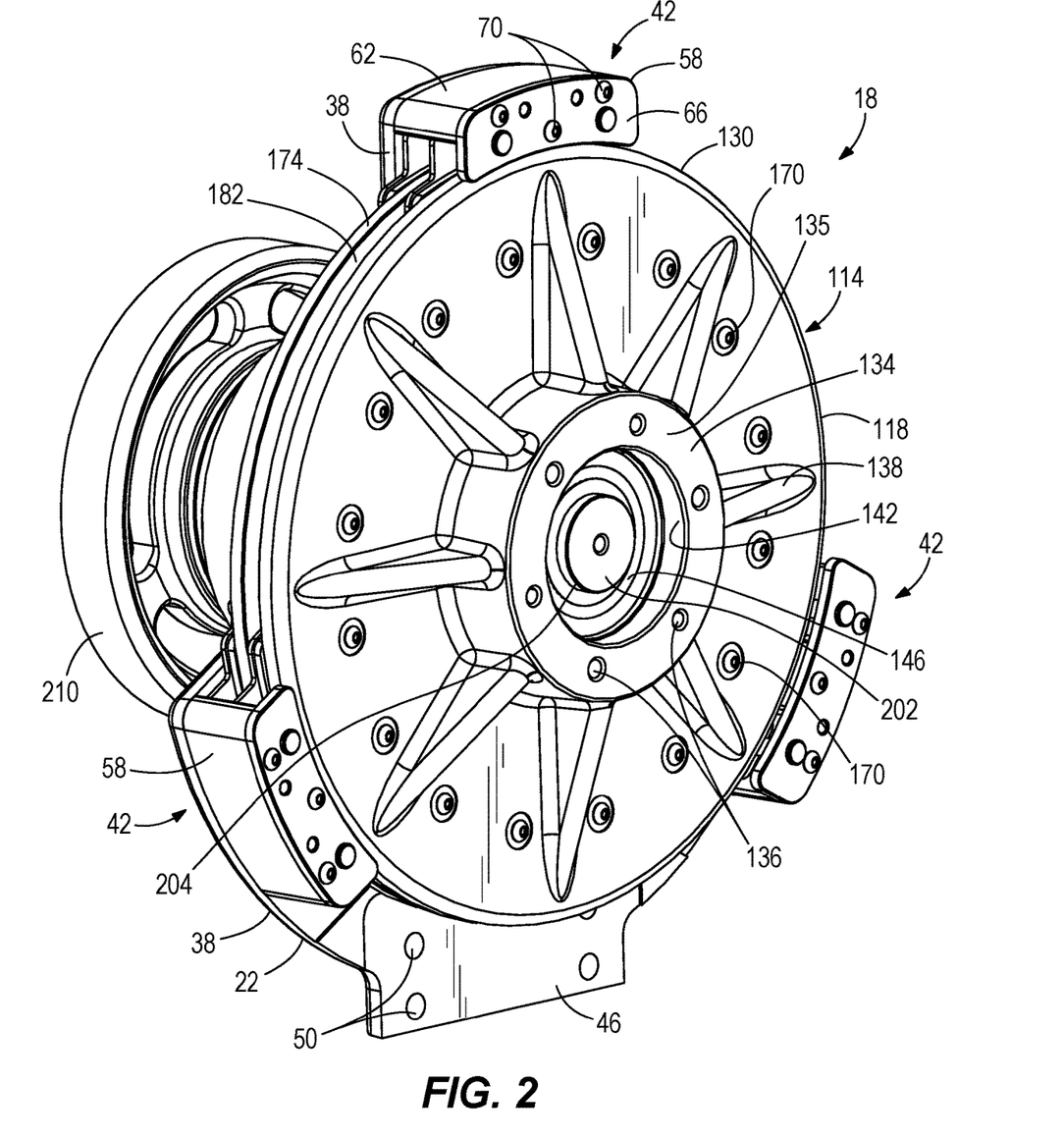
FIG. 2 is a perspective view of a tension brake assembly according to the invention and taken from the hub side.
Figure 3:
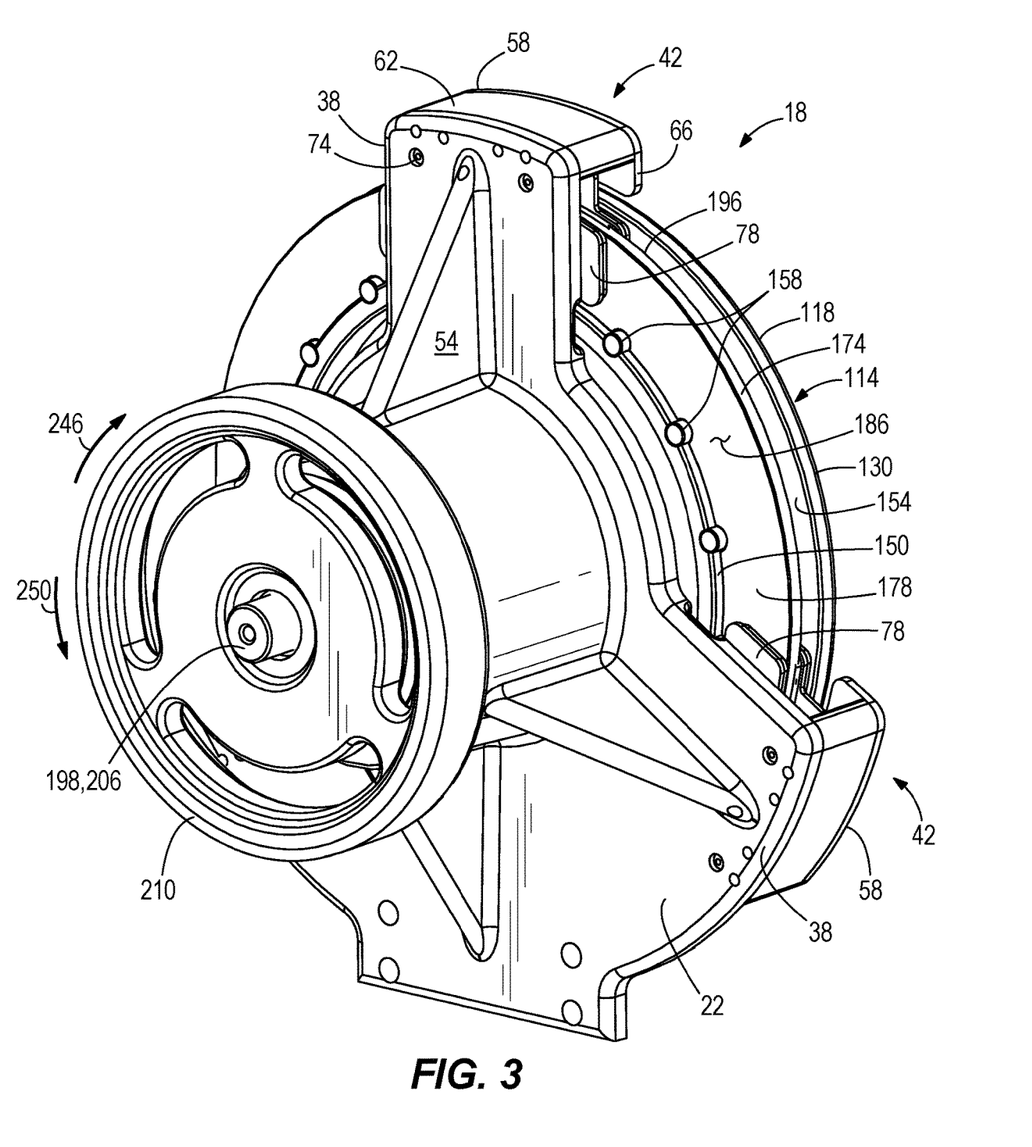
FIG. 3 is a perspective view of the tension brake assembly of FIG. 2 taken from the frame and actuator side.
Figure 4:
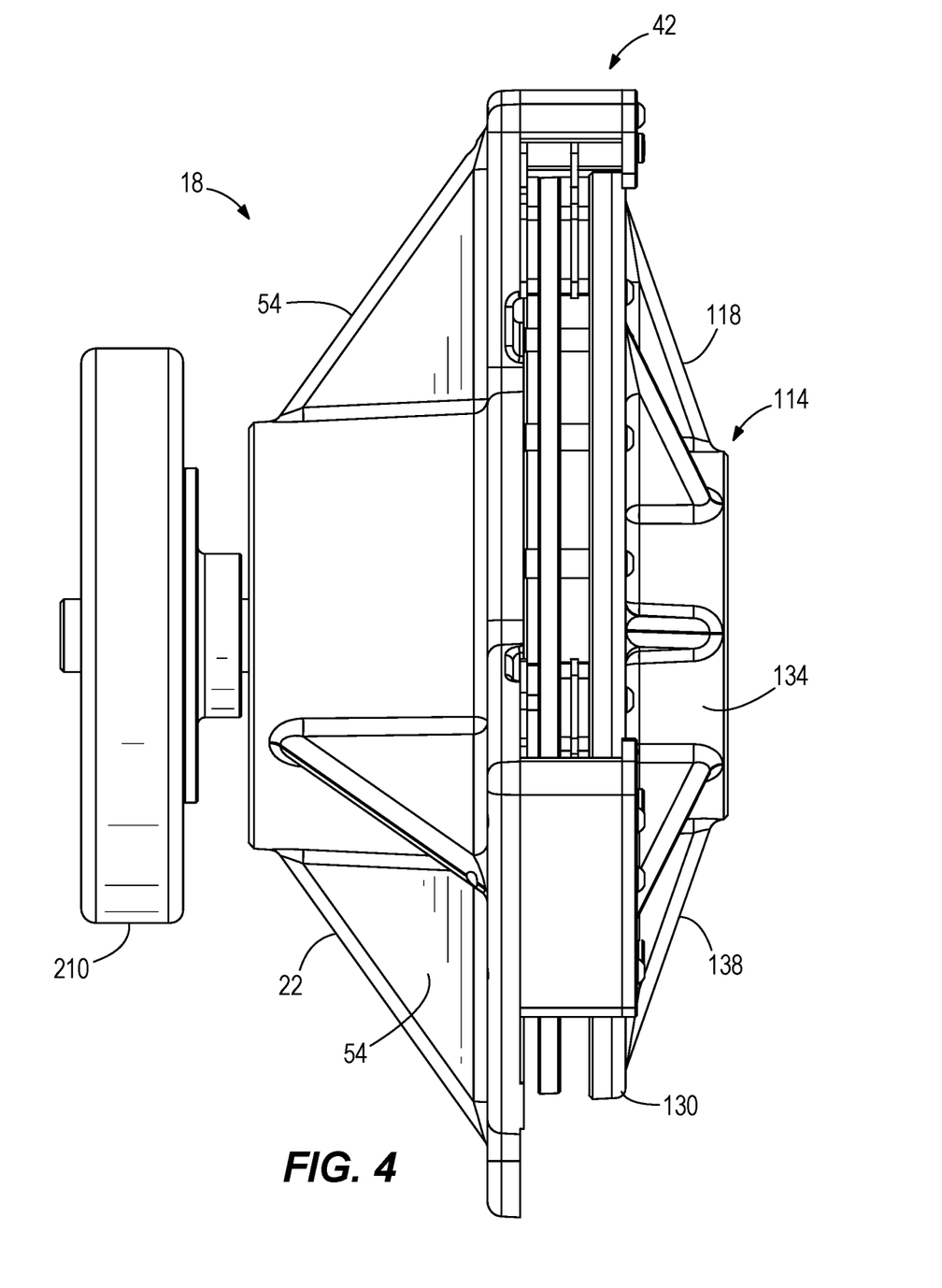
FIG. 4 is a side view of the tension brake assembly of FIG. 2.

The present disclosure describes an improved tension brake assembly 18 for use with reel units 10 or other industrial applications that may require a tension brake. FIGS. 2-4 illustrate the tension brake assembly 18.

Figure 5:
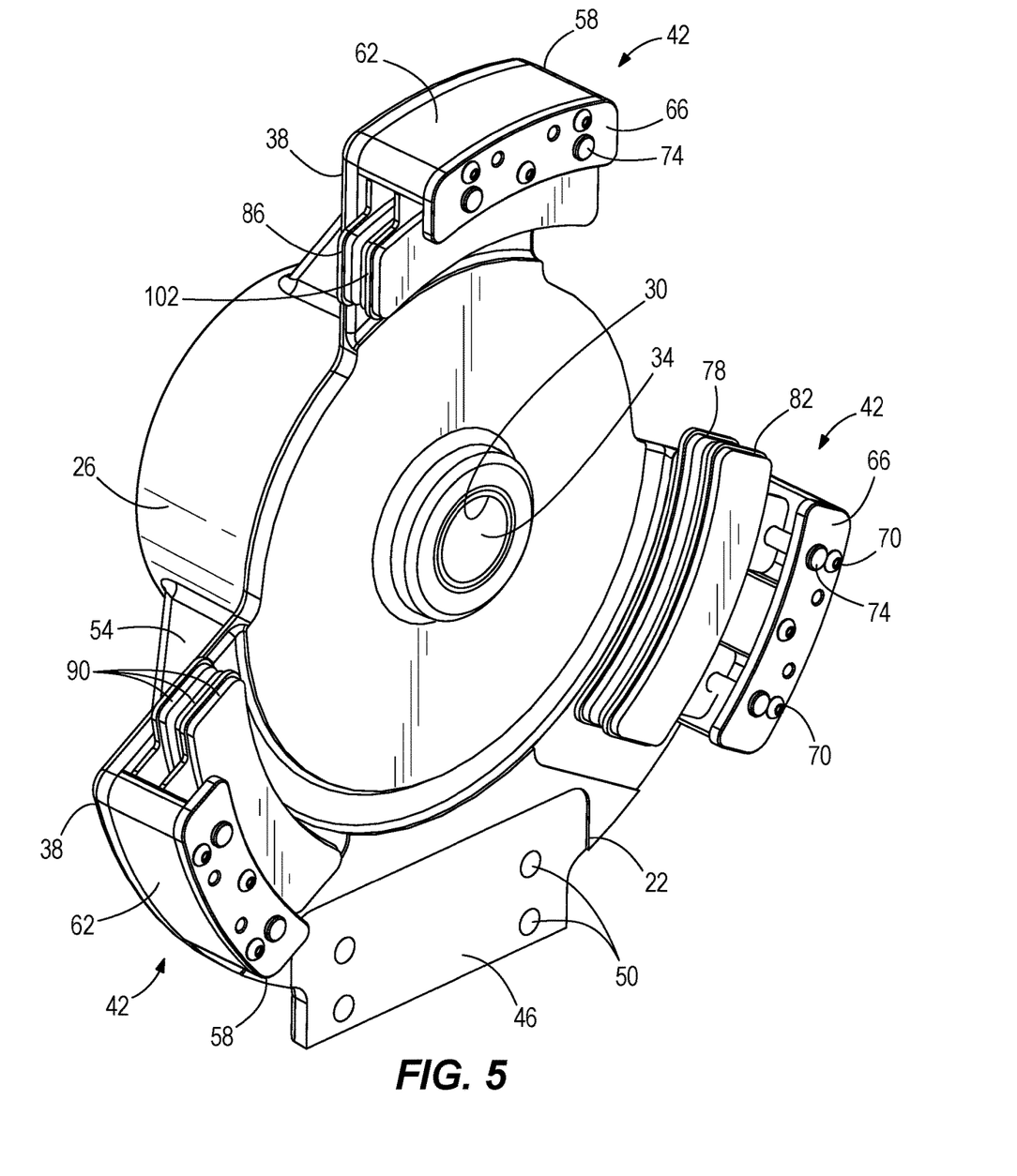
FIG. 5 is a perspective view illustrating the frame and the mounted brake pad assemblies.
Figure 6:
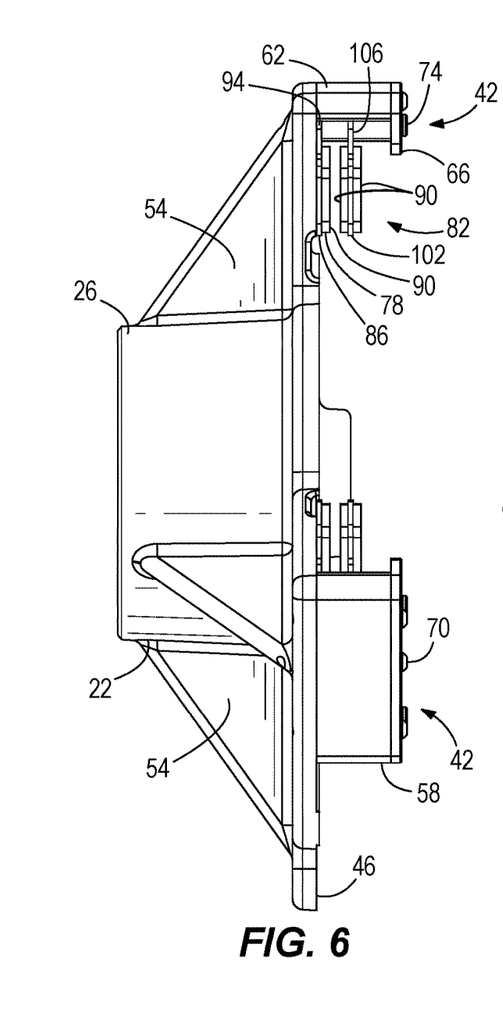
FIG. 6 is a side view of the frame and mounted brake pad assemblies of FIG. 5
Figure 7:
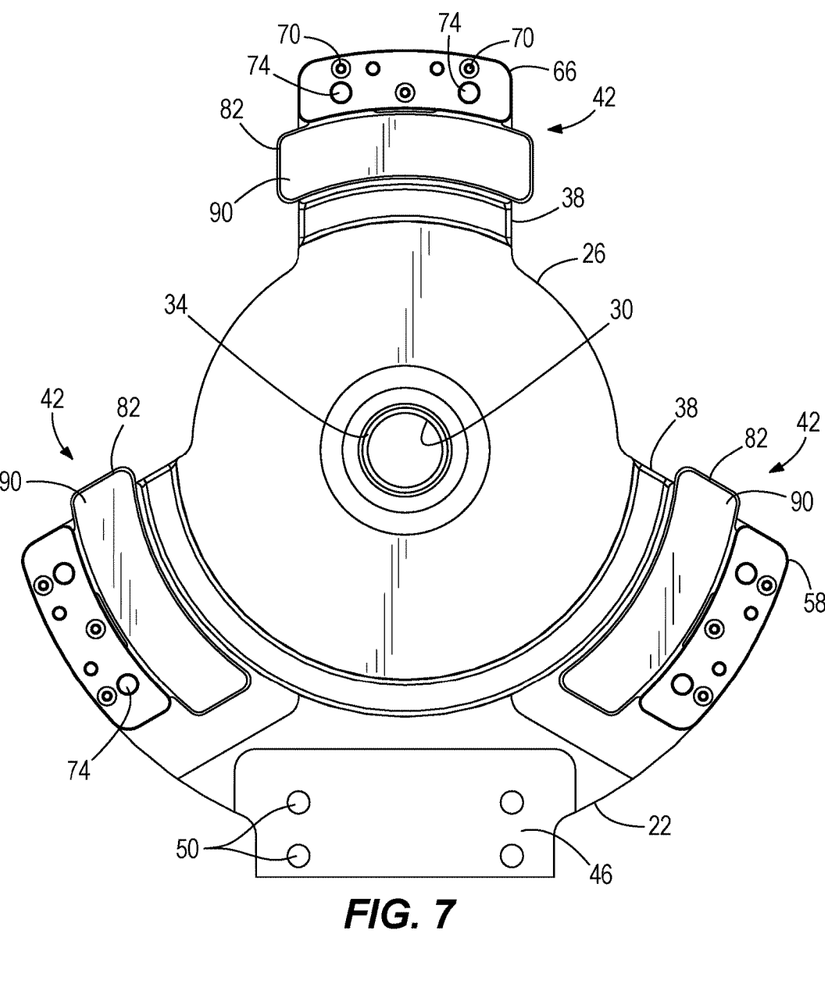
FIG. 7 is a front view of the frame and mounted brake pad assemblies of FIG. 5

The tension brake assembly 18 includes a frame 22, which in the illustrated embodiment is a cast aluminum part. With additional reference to FIGS. 5-7, the frame 22 includes a central body portion 26 having a bore 30. In the illustrated embodiment, a bushing 34 (e.g., a brass or bronze bushing) is positioned in the bore 30. A plurality of webs or extensions 38 project radially outwardly from the central body portion 26 to support brake pad assemblies 42, which will be described in detail below. As best shown in FIG. 7, the frame 22 includes one web 38 extending from the top of the central body portion 26 at the 12 o'clock location, and a larger, second web 38 extending from the bottom of the central body portion 26 and spanning from about the 4 o'clock position to the 8 o'clock position. A mounting surface 46 is provided on the lower web 38. The mounting surface includes apertures 50 to receive fasteners (see FIG. 1B) for mounting the tension brake assembly 18 to the reel unit 10, 10' or other machinery. In some embodiments, a mounting bracket 52 (see FIG. 1B) can be secured to the mounting surface 46 to interface with the reel unit 10, 10'. The frame 22 is therefore fixed to the reel unit 10, 10' and defines a stationary, or non-rotating component of the tension brake assembly 18. Reinforcing ribs 54 can be provided, and as illustrated, extend between the webs 38 and the central body portion 26 to provide strength and rigidity to the webs 38.

The frame 22 supports a plurality of brake pad assemblies 42. In the illustrated embodiment, three brake pad assemblies 42 are supported by the webs 38 and are substantially evenly spaced at about 120 degree increments about the circumferential extent of the central body portion 26. While other embodiments could use fewer or more brake pad assemblies 42, the use of three evenly-spaced brake pad assemblies 42 has been found to provide a good balance between providing enough contact points to maintain a generally planar engagement with the rotating brake components (to be described below), while still providing enough open space (e.g., in the circumferential direction) between the brake pad assemblies 42 for cooling purposes.

Figure 8:
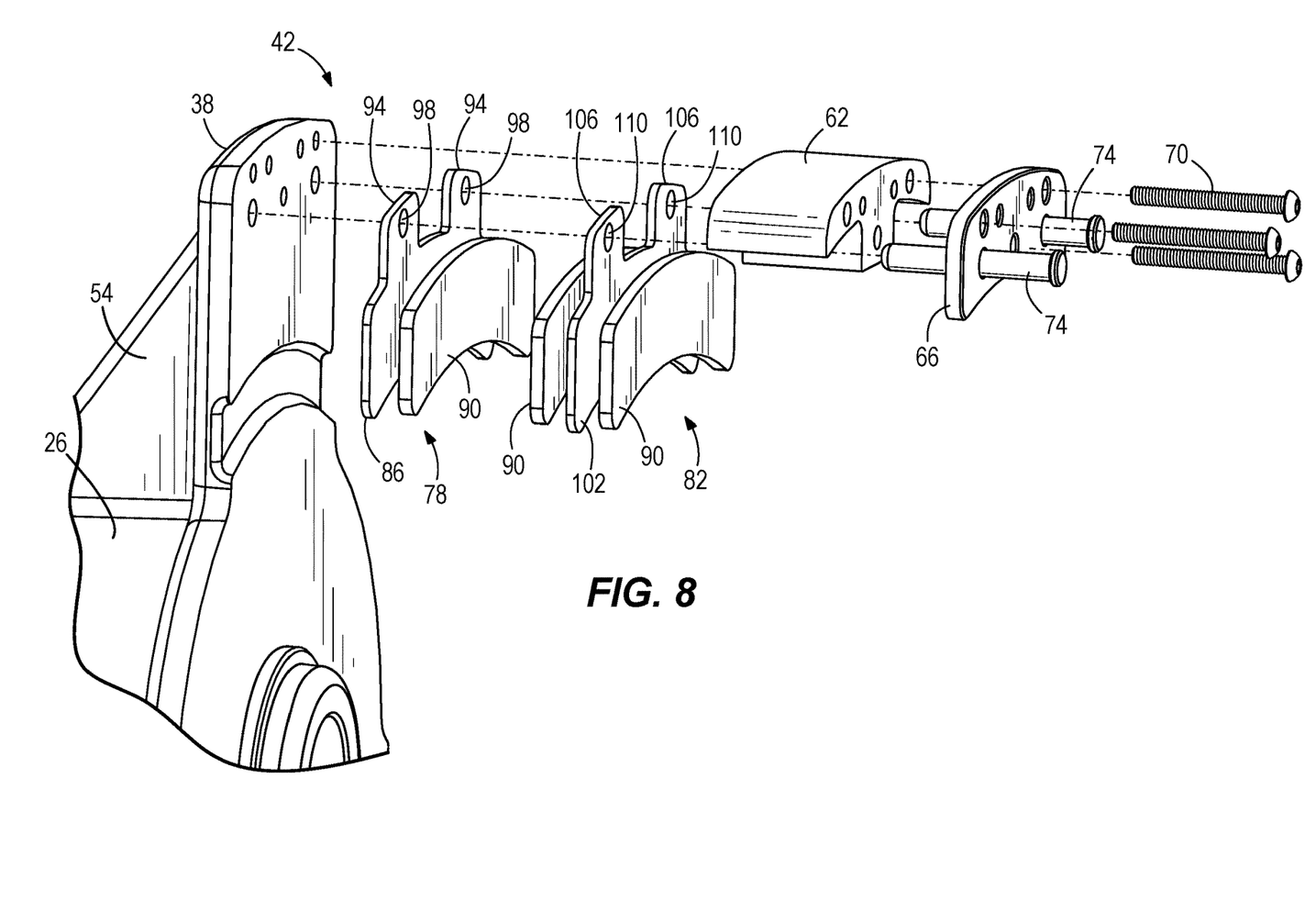
FIG. 8 is an exploded view of a brake pad assembly.

With reference to FIG. 8, all three brake pad assemblies 42 are identical in the illustrated embodiment, and each includes a brake pad carrier 58 (see FIG. 3) that is coupled to the frame 22 on a web 38. Each brake pad carrier 58 includes an axially-extending cover portion 62 and an end plate 66. The illustrated cover portion 62 is formed as an extrusion that is sized and configured to be coupled to a radially outer extent of the frame 22 at a web 38. The cover portion 62 extends axially away from the frame 22 and provides protection to the brake pad assembly 42 from the radially outward direction. The end plate 66 is secured to the cover portion 62 and extends radially inwardly from the cover portion 62. In the illustrated embodiment, fasteners 70 are provided to secure the end plate 66 to the cover portion 62, and the cover portion 62 to the frame 22 at a web 38.

Each brake pad assembly further includes one or more brake pad pins 74 that are constrained axially between the web 38 of the flange 22 on one end, and the end plate 66 on the other end. The cover portion 62 is therefore positioned radially outside of the brake pad pins 74. In the illustrated embodiment, two brake pad pins 74 are used in each brake pad assembly 42. The brake pad pins 74 can be made from brass, bronze, aluminum, or other suitable materials.

Each bake pad assembly 42 further includes a first brake pad 78 and a second brake pad 82. The first brake pad 78 includes a first backing plate 86 on which a friction material 90 is provided on one side (and only on one side in the illustrated embodiment). The first backing plate 86 can be made of aluminum or other suitable materials, and in the illustrated embodiment, includes two radially outwardly extending tabs 94 having through holes 98 sized to each receive a respective one of the two brake pad pins 74. In this manner, the first brake pad 78 is secured radially relative to the brake pad carrier 58, but can move (e.g., slide) axially along the brake pad pins 74. The second brake pad 82 includes a second backing plate 102 that is the same size and shape as the first backing plate 86, but that has friction material 90 on both oppositely facing sides of the second backing plate 102. The second backing plate 102 can also be made of aluminum or other suitable materials, and also includes two radially outwardly extending tabs 106 having through holes 110 sized to each receive a respective one of the two brake pad pins 74. In this manner, the second brake pad 82 is also secured radially relative to the brake pad carrier 58, but can move (e.g., slide) axially along the brake pad pins 74. In the illustrated embodiment, the friction material 90 is ASI-747, a flexible, rubber-phenolic friction material lining for high to low-energy applications. The friction material 90 is available from JBT Corporation of Mequon, Wisconsin as T-712 material. Other suitable materials can also be substituted.

Figure 9:
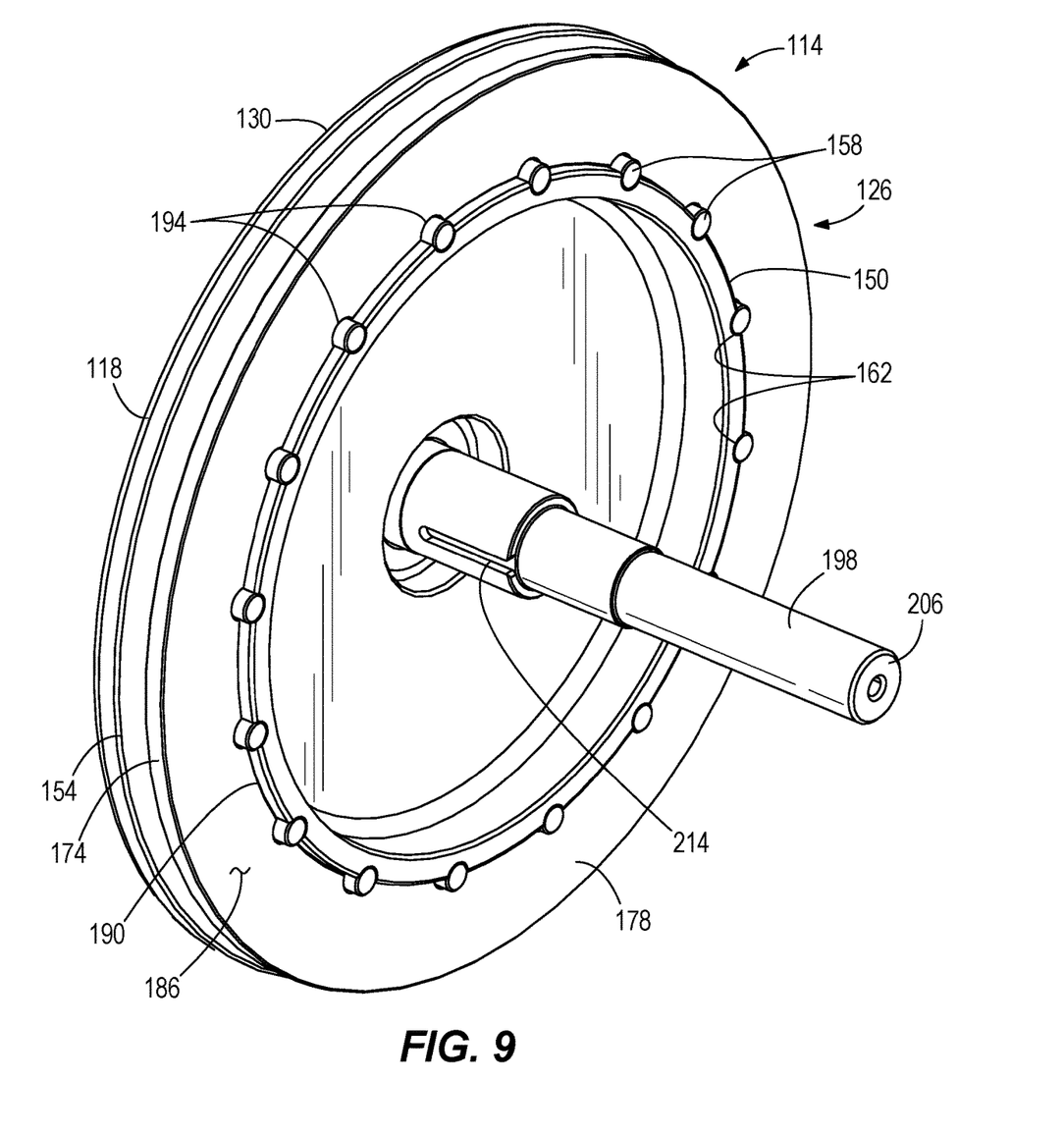
FIG. 9 is a perspective view illustrating the hub assembly and shaft.
Figure 10:
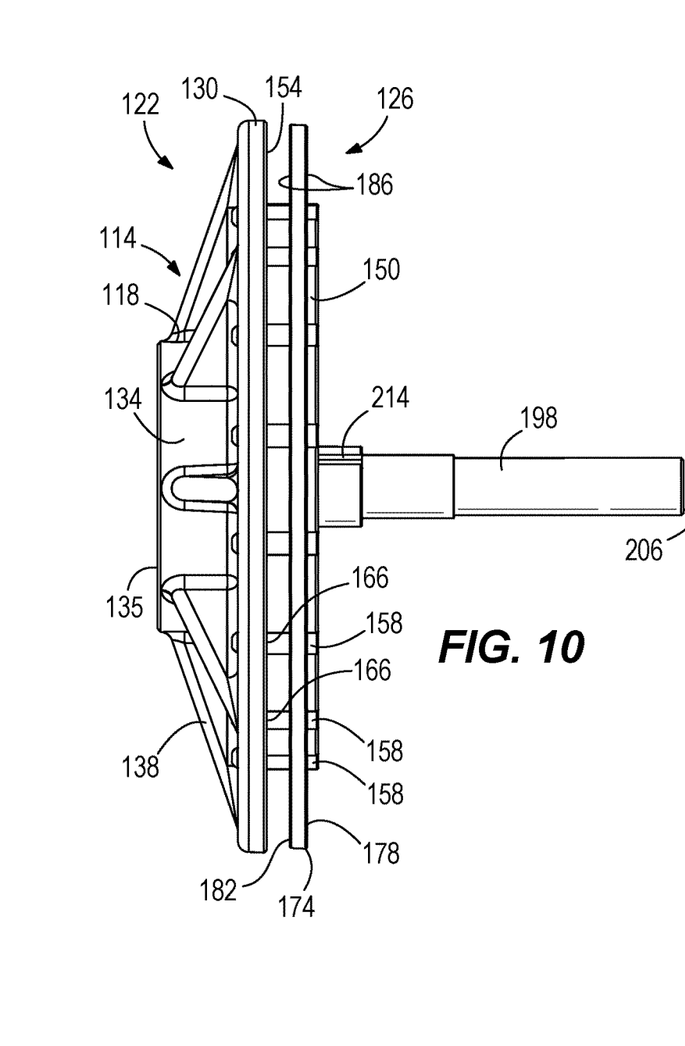
FIG. 10 is a side view of the hub assembly and shaft of FIG. 9.
Figure 11:
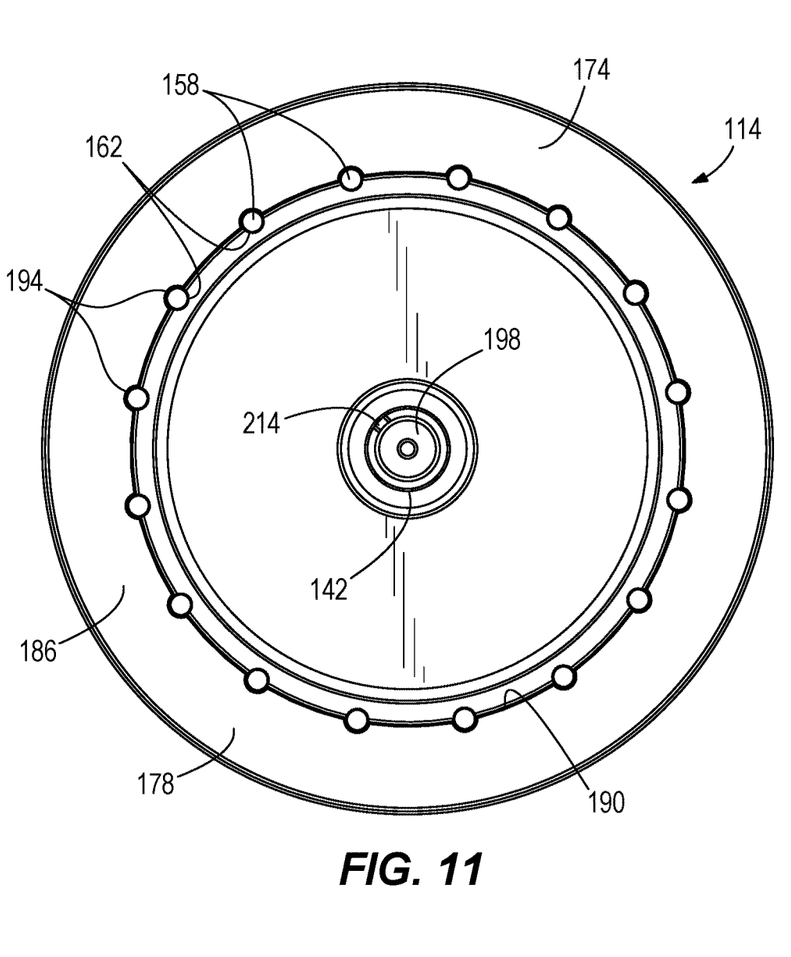
FIG. 11 is a rear view of the hub assembly and shaft of FIG. 9.

The tension brake assembly 18 also includes a hub assembly 114. As will be described further below, the hub assembly 114 includes components that rotate with the reel unit 10, 10', and thus the hub assembly 114 forms a rotating portion of the tension brake assembly 18. With additional reference to FIGS. 8-10, the hub assembly 114 includes a hub body 118, which in the illustrated embodiment is a cast aluminum part. As shown in FIG. 10, the hub body 118 includes a first side 122 configured to face and be mounted to a rotating component of the reel unit 10, 10' (e.g., a shaft or shaft extension on which the reel of product 14 rotates). The hub body 118 further includes a second side 126 configured to face and interact with the frame 22 and the brake pad assemblies 42.

The illustrated hub body 118 includes a disc-shaped central region 130 from which a smaller-diameter annular mounting projection 134 extends on the first side 122. As best shown in FIG. 2, an axial end face 135 of the mounting projection 134 includes mounting apertures 136 provided to secure the mounting projection 134, and therefore the hub body 118, to the reel unit 10, 10' for rotation therewith. Reinforcing ribs 138 extend between the disc-shaped central region 130 and the annular mounting projection 134 to provide strength and rigidity. A bore or aperture 142 extends axially through the annular mounting projection 134 and the disc-shaped central region 130 and houses a bearing 146 (see FIG. 2) that is part of the hub assembly 114. In the illustrated embodiment, the bearing 146 is a rolling element bearing.

The hub body 118 further includes an annular wall 150 that extends axially from the disc-shaped central region 130 toward the frame 22 on the second side 126 of the hub body 118. The second side 126 of the disc-shaped central region 130 radially outside of the annular wall 150 includes an annular friction surface 154 provided thereon. The annular friction surface 154 extends substantially from the annular wall 150 to a radially-outermost extent of the disc-shaped central region 130. The illustrated friction surface 154 is formed by the application of a thermal spray coating containing aluminum and bronze, or an aluminum oxide ceramic, directly onto the surface of the disc-shaped central region 130.

The hub assembly 114 further includes a plurality of drive pins 158 extending from the second side 126 of the disc-shaped central region 130 toward the frame 22. As illustrated, there are sixteen drive pins 158 positioned substantially evenly about the circumference of the second side 126 of the hub body 118. The drive pins 158 are positioned adjacent a radially-outer surface of the annular wall 150, and in the illustrated embodiment, each drive pin 158 is partially received in a respective scallop or recess 162 formed in the radially-outer surface of the annular wall 150. A first end 166 of each drive pin 158 abuts the second side 126 of the disc-shaped central region 130 and may be slightly recessed into an aperture formed on the second side 126 of the disc-shaped central region 130. A threaded blind bore in the first end 166 of each drive pin 158 receives a respective fastener 170 (see FIG. 2) extending from the first side 122 of the disc-shaped central region 130, through an aperture in the disc-shaped central region 130, and into the blind bore to secure the respective drive pin 158 to the hub body 118, and more specifically to the disc-shaped central region 130. As will be described further below, the drive pins 158 are provided to transmit torque from the rotating hub body 118 to a rotor 174 coupled with the hub body 118 for rotation therewith. The drive pins 158 can be made of brass, bronze, or other suitable materials.

The hub assembly 114 further includes a rotor 174 coupled to the hub body 118 for rotation therewith. The illustrated rotor 174 is an annular disc made of aluminum or other suitable material. The oppositely-facing axial sides of the rotor 174 (i.e., a first side 178 facing the frame 22 and second side 182 facing the hub body 118) are both provided with a friction surface 186. The illustrated friction surfaces 186 are formed by the application of a thermal spray coating containing aluminum and bronze, or an aluminum oxide ceramic, directly onto the oppositely-facing surfaces of the rotor 174. The central bore or aperture 190 of the annular rotor 174 has a diameter sized to receive the annular wall 150 therein. Furthermore, the central aperture 190 of the rotor 174 includes a plurality of scallops or recesses 194 sized and configured to receive the respective plurality of drive pins 158 positioned circumferentially about the annular wall 150. With this arrangement, the engagement between the drive pins 158 and the recesses 194 enables the rotor 174 to be rotationally driven by rotation of the hub body 118, while also being axially movable relative to the hub body 118 by virtue of sliding engagement between the drive pins 158 and the recesses 194 in the rotor 174. As best seen in FIG. 3, the outer diameter edge surface 196 and much of the first side 178 of the rotor 174 are exposed to view, and to the ambient air, between the adjacent brake pad assemblies 42, thereby enhancing cooling of the rotor 174.

Figure 12:
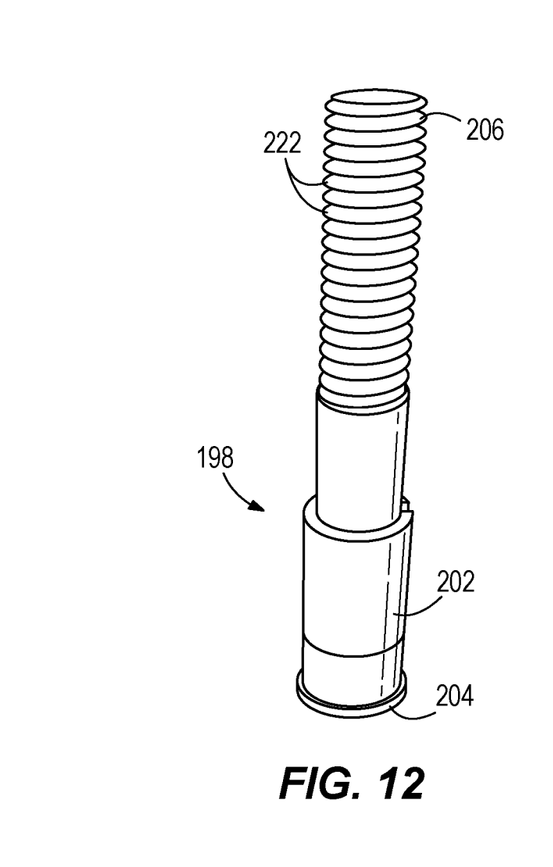
FIG. 12 is a side view of the shaft of the tension brake assembly of FIG. 2.

The tension brake assembly 18 further includes a shaft 198 supported by the frame 22 and about which the hub body 118 rotates. The shaft 198 does not rotate with the hub body 118. A first end 202 of the shaft 198 is supported by the bearing 146 in the hub body 118 (see FIG. 2). A shoulder 204 at the first end 202 limits/prevents movement of the hub body 118 axially in the direction of the first end 202 due to engagement between the bearing 146 and the shoulder 204. The shaft 198 extends from its first end 202 to a second end 206, passing through the aperture 142 in the hub body 118, through the central aperture 190 of the rotor, into the bore 30 of the frame 22, and through the bushing 34 housed in the bore 30. The second end 206 of the shaft 198 extends out of the bushing 34 and the bore 30 to receive an actuator 210, as will be described in further detail below. The shaft 198 includes a keyway 214 (see FIGS. 8 and 9) that interfaces with a key in the bore 30 to prevent rotation of the shaft 198, thereby keeping the shaft 198 static or non-rotational relative to both the rotating hub body 118 and the frame 22. As shown in FIG. 12, the second end 206 of the shaft 198 includes threads 222 (threads not shown in the CAD rendition of FIGS. 3, 4, 9, and 10).

Figure 13:
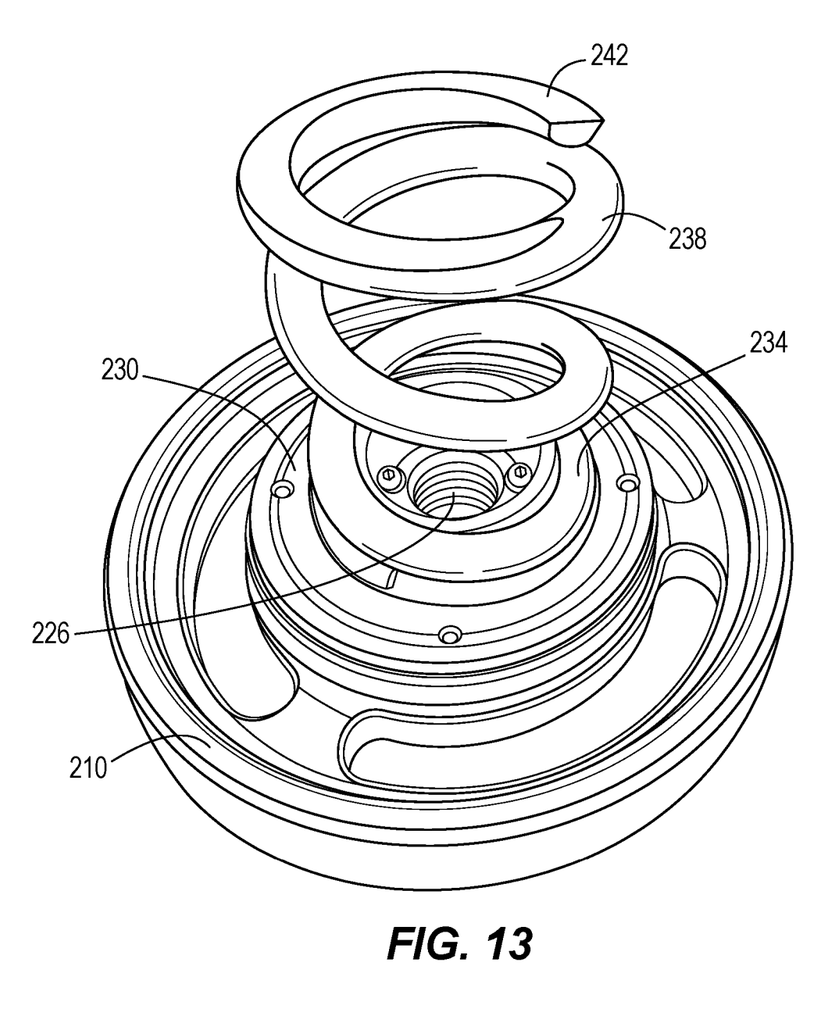
FIG. 13 is a perspective view of the actuator and spring of the tension brake assembly of FIG. 2.

The actuator 210 is coupled to the second end 206 of the shaft 198. With additional reference to FIG. 13, the illustrated actuator 210 is a hand wheel having a threaded bore 226 configured to receive the threaded second end 206 of the shaft 198. The body of the hand wheel 210 can be made of aluminum or other suitable materials. The illustrated actuator 210 further includes a friction pad 230 configured to abut an end surface of the central body portion 26 of the frame 22 and/or a first end 234 of a compression spring 238. The compression spring 238 is housed within a cavity formed in the central body portion 26 of the frame 22, where the spring 238 bears against the friction pad 230 of the hand wheel 210 at the first end 234 of the spring 238, and where the spring 238 bears against the inner axial end surface of the central body portion 26 at the second end 242 of the spring 238. It should be noted that the illustrated hand wheel actuator 210 is just one example of an actuator that can be used with the tension brake assembly 18. Other manual lever or wheel arrangements, or electro-mechanical actuator arrangements can be substituted for the hand wheel 210. Hydraulic or pneumatic pressure could be used as an alternative to the spring pressure.

When assembled, the tension brake assembly 18 provides the following frictional engagements. The friction surfaces 90 of the first brake pads 78 engage with the friction surface 186 on the first side 178 of the rotor 174. The first brake pads 78 are therefore axially positioned between the webs 38 of the frame 22 and the first side 178 of the rotor 174. The second brake pads 82 are positioned axially between the second side 182 of the rotor 174 and the second side 126 of the disc-shaped central region 130 of the hub body 118. Therefore, friction surfaces 90 on one side of the second brake pads 82 engage with the friction surface 186 on the second side 182 of the rotor 174. Friction surfaces 90 on the opposite side of the second brake pads 82 engage with the friction surface 154 on the second side 126 of the disc-shaped central region 130 of the hub body 118. One of skill in the art will understand how the level of friction or tension exerted by the tension brake assembly 18 can be varied by varying the axial spacing between the above-described frictional engagements. Furthermore, one of skill in the art will understand that while the illustrated embodiment includes only one rotor 174, the tension brake assembly 18 could be modified to include two or more rotors, along with additional sets of intervening brake pads, in order to increase the number of frictional engagements. The design of the tension brake assembly 18 could be easily extended in the axial direction such that additional rotors and intervening brake pads could be added as desired.

Figure 15:
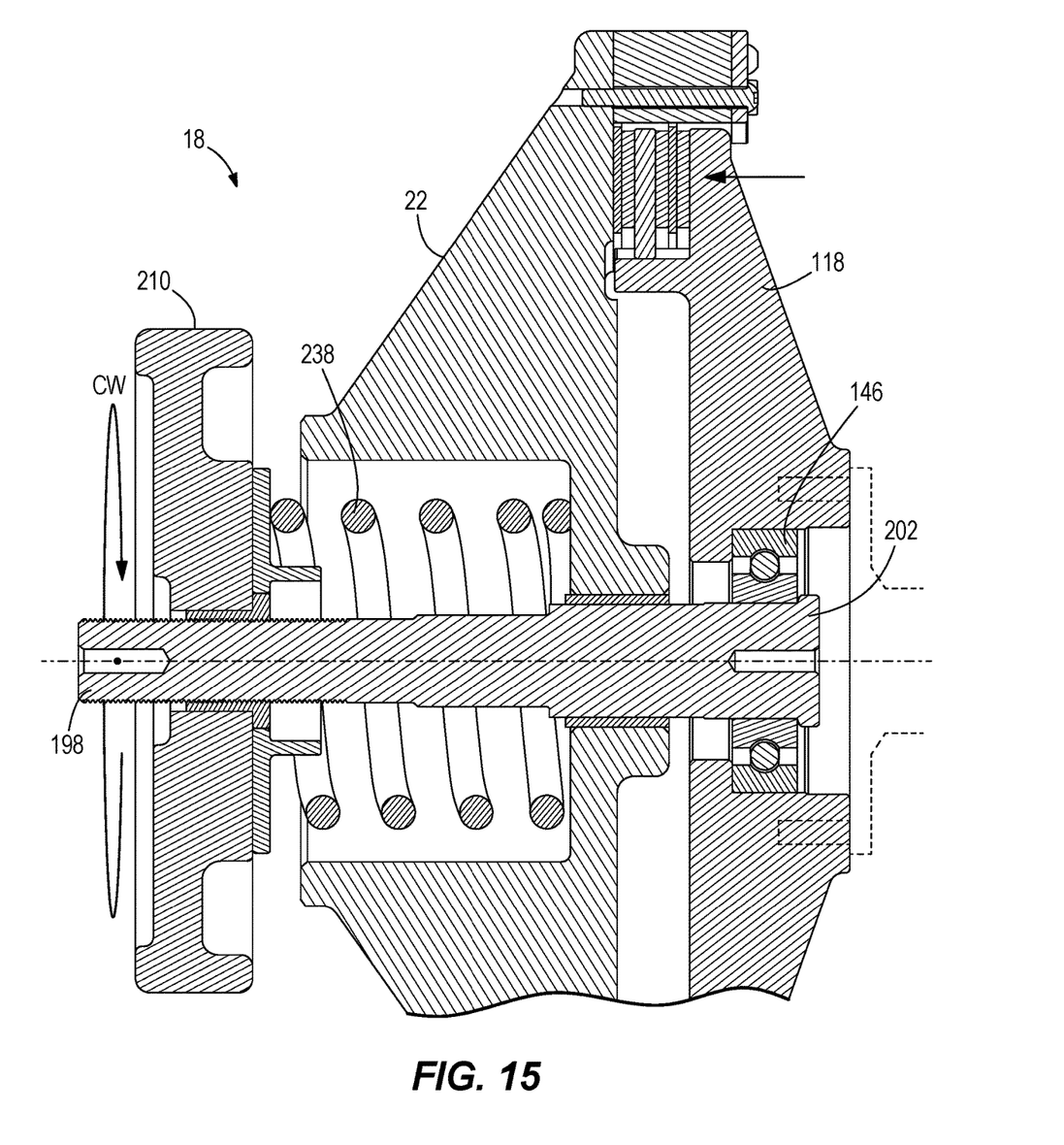
FIG. 15 is a section view of the tension brake assembly of FIG. 2 illustrating operation to increase tension.

The operation of the tension brake assembly 18 will now be described. With the hub body 118 mounted to the reel unit 10, 10' at the mounting projection 134, the actuator 210 can be manipulated to adjust the tension provided by the tension brake assembly 18 to the reel unit 10, 10'. Referring to FIG. 15, by rotating the hand wheel 210 in a first, clockwise direction 246 (see FIG. 3), the spring 238 compresses between the hand wheel 210 and the frame 22 as the hand wheel 210 moves along the shaft 198 toward the first end 202. This draws the frame 22 and the hub body 118 closer together in the axial direction, thereby compressing the above-described frictional engagements axially. This increases the friction at all of the frictional engagement sites, thereby increasing the tension provided by the tension brake assembly 18 on the reel unit 10, 10'. The sliding axial engagements between the brake pads 78, 82 and the brake pad pins 74, and between the rotor 174 and the drive pins 158, provides the "play" needed for the variable axial movement of the components.

Figure 14:
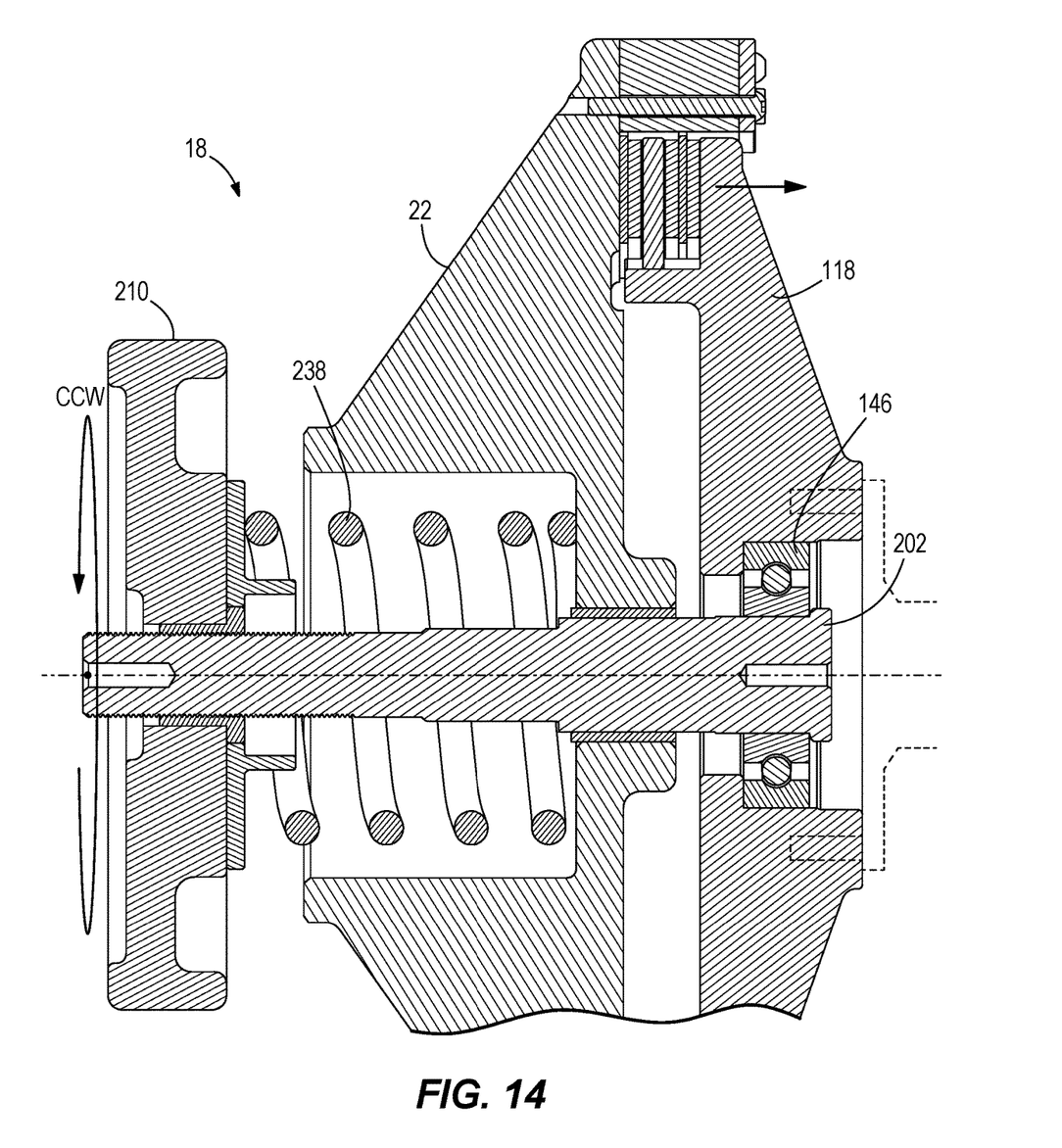
FIG. 14 is a section view of the tension brake assembly of FIG. 2 illustrating operation to reduce tension.

To reduce the tension provided by the tension brake assembly 18, as illustrated in FIG. 14, the user rotates the hand wheel 210 in a second, counter-clockwise direction 250 (see FIG. 3). This reduces the compression on the spring 238 and relaxes the axial force exerted between the frame 22 and the hub body 118, thereby increasing the axial spacing between the frame 22 and the hub body 118 and reducing the friction at all of the frictional engagement sites.

In addition to the ability to make tension adjustments based on the desired product delivery rate, the easy adjustability also accommodates wearing of the braking surfaces by allowing quick adjustment to maintain a desired tension as the parts wear over time from use.

Various aspects of the disclosure are set forth in the following claims.

What is claimed is:

1. A tension brake assembly comprising:
   a frame having a mounting surface configured for mounting the tension brake assembly to a machine;
   a plurality of brake pad assemblies coupled to the frame, each brake pad assembly including
      a brake pad carrier coupled to the frame;
      a first brake pad having a friction surface on one side;
      a second brake pad having friction surfaces on first and second sides; and
      a plurality of brake pad pins supporting the first and second brake pads in the brake pad carrier and allowing the first and second brake pads to move in an axial direction relative to the frame;
   a hub assembly configured to be coupled to a rotating component of the machine, the hub assembly including
      a hub body having a first side configured to be mounted to the rotating component of the machine, and a second side facing the frame, the second side including
         a friction surface for selective engagement with a friction surface on the second brake pad, and
         an annular wall extending toward the frame;
      a bearing positioned within an aperture in the hub body; and
      a plurality of drive pins extending from the second side of the hub body toward the frame adjacent the annular wall;
   a rotor positioned adjacent the annular wall and engaging the plurality of drive pins such that rotation of the hub body causes rotation of the rotor while permitting movement of the rotor in the axial direction relative to the annular wall and the drive pins, the rotor having a first friction surface on a first side of the rotor facing the frame, and a second friction surface on a second side of the rotor facing the hub body; wherein the first brake pad is positioned for engagement with the first friction surface of the rotor and the second brake pad is positioned for engagement with the second friction surface of the rotor;
   a shaft having a first end supported by the bearing in the hub body and a second end, the shaft extending from the bearing, out of the aperture in the hub body, and though a bore in the frame; and
   an actuator coupled with the second end of the shaft;
   wherein movement of the actuator in a first direction moves the hub body relatively toward the frame in the axial direction to increase friction exerted by the tension brake assembly, and
   wherein movement of the actuator in a second direction moves the hub body relatively away from the frame in the axial direction to decrease friction exerted by the tension brake assembly.

2. The tension brake assembly of claim 1, wherein the friction surfaces on the rotor and the hub body are formed by a thermal spray coating.

3. The tension brake assembly of claim 2, wherein the thermal spray coating contains aluminum and bronze.

4. Then tension brake assembly of claim 2, wherein the thermal spray coating is an aluminum oxide ceramic coating.

5. The tension brake assembly of claim 1, wherein there are three brake pad assemblies evenly spaced about the frame.

6. The tension brake assembly of claim 1, wherein an outer diameter edge surface of the rotor is exposed to view between adjacent brake pad assemblies.

7. The tension brake assembly of claim 1, wherein each drive pin is received in a respective recess in the annular wall.

8. The tension brake assembly of claim 7, wherein each drive pin includes a threaded blind bore that receives a fastener extending from the first side of the hub body, through an aperture in the hub body, and into the blind bore to secure the drive pin to the hub body.

9. The tension brake assembly of claim 8, wherein each drive pin is made of brass.

10. The tension brake assembly of claim 7, wherein each drive pin is received in a respective recess in the rotor.

11. The tension brake assembly of claim 10, wherein the rotor is movable axially along the drive pins.

12. The tension brake assembly of claim 1, wherein the actuator is a rotatable hand wheel in threaded engagement with the second end of the shaft.

13. The tension brake assembly of claim 12, further comprising a spring positioned between the hand wheel and the frame, and wherein rotation of the hand wheel in the first direction compresses the spring, and rotation of the hand wheel in the second direction decompresses the spring.

14. The tension brake assembly of claim 1, wherein the bearing is a rolling element bearing.

15. The tension brake assembly of claim 1, wherein each brake pad carrier includes an axially-extending cover portion and an end plate, and wherein the brake pad pins are constrained axially between the flange on one end and the end plate on the other end, with the cover portion positioned radially outside of the brake pad pins.

16. The tension brake assembly of claim 15, wherein the end plate is secured to the cover portion by fasteners distinct from the brake pad pins.

17. The tension brake assembly of claim 1, wherein the mounting surface of the frame includes apertures configured to receive fasteners to connect the frame to a mounting bracket or to the machine.

18. The tension brake assembly of claim 1, wherein the bore in the frame includes a bushing for supporting the shaft.

19. The tension brake assembly of claim 1, wherein the shaft is keyed to the frame such that the shaft does not rotate with the hub body.

* * * * *